INVENTORS.
Stanley R. Rich
BY Wilfred Roth

ATTORNEYS

United States Patent Office 2,837,913
Patented June 10, 1958

2,837,913

TEMPERATURE-COMPENSATED VISCOSIMETER

Stanley R. Rich and Wilfred Roth, West Hartford, Conn., assignors to Bendix Aviation Corporation, New York, N. Y., a corporation of Delaware Application November 9, 1953, Serial No. 391,086

11 Claims. (Cl. 73—59)

This invention relates to the field of viscosimetry, and particularly to the automatic temperature compensation of viscosity measurements.

In our co-pending application Ser. No. 227,694, filed May 22, 1951, for "Measuring Apparatus and Method Therefor," we have described apparatus for measuring physical properties, including a function of viscosity, of fluid-like materials such as liquids, slurries, colloids, suspensions, fluidized solids, etc.

As is well known, the viscosity of a material varies with temperature. In many cases of great commercial importance the variation with temperature is very rapid. For example, the viscosity of a standard petroleum oil may vary approximately 5% per degree in the vicinity of 120° F. In industrial processes it is often necessary to know the viscosity with an accuracy of better than a few percent. This requires either close temperature control or simultaneous measurement of viscosity and temperature with subsequent reference to tables or charts. Close temperature control is often impractical. As an illustration, in the case of the above-mentioned oil the temperature would need to be held within 0.2 degree to know the viscosity within 1%. The simultaneous measurement of temperature and subsequent reference to tables or charts is inconvenient and time consuming, and not well suited to a continuous production process. Thus an instrument capable of measuring viscosity under varying temperature conditions and automatically converting the measurements to the viscosity the material would have at a predetermined reference temperature is highly useful, and is a primary object of the present invention.

In many cases of great practical importance the range of temperature variation from a given temperature is not great, so that an apparatus capable of correcting viscosity indications over a limited range of temperatures is highly useful. However, the operating temperatures of different processes may be quite different. Accordingly, it is highly desirable that the reference temperature for the temperature compensation be adjustable at will to take care of different process conditions.

Different liquids or other fluid-like materials have different viscosity-temperature characteristics, that is, different percent changes in viscosity for a given change in temperature. Accordingly, it is important to be able to adjust an instrument for materials of different characteristics.

In accordance with the present invention apparatus is provided including a temperature-sensitive device adapted to respond to the temperature of the fluid-like material whose viscosity is being measured. Means are then provided for producing an output which varies both with the original indication of viscosity and the difference between the actual temperature of the fluid-like material and a predetermined reference temperature. This output is then combined with the output representing the original indication of viscosity to produce a resultant representing the viscosity at the predetermined temperature. Means are provided for altering the reference temperature at will and means are also provided whereby proper temperature compenstaion can be obtained for fluid-like materials of widely different temperature-viscosity characteristics.

The invention will be more fully understood by reference to the following description of a specific embodiment thereof, taken in connection with the drawings in which.

Figure 1:
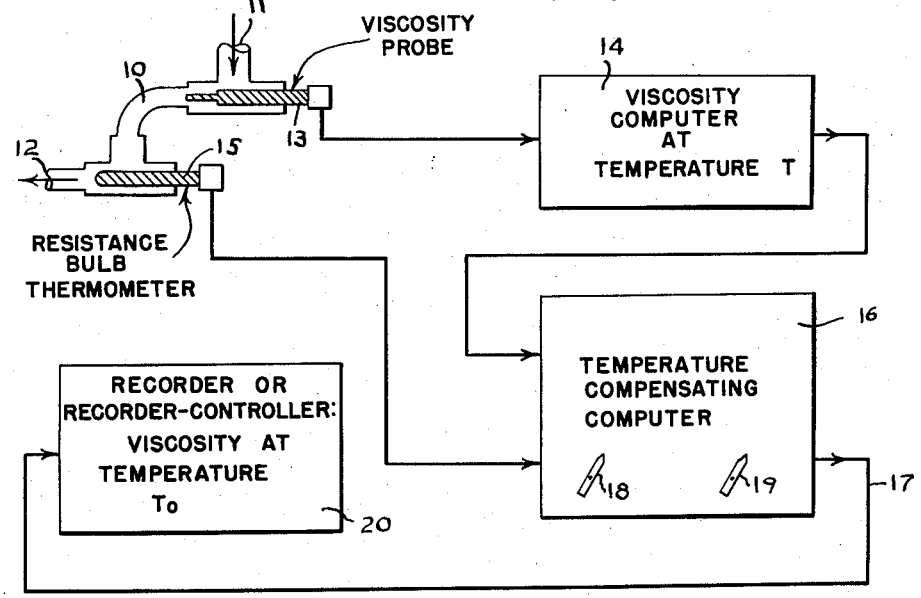
Fig. 1 is a block diagram showing the general arrangement of a specific embodiment of the invention.

Referring to Fig. 1, the fluid-like material whose viscosity is to be measured is assumed to flow through a pipe 10 having an inlet 11 and outlet 12. A probe 13 is contacted by the fluid-like material and may be one of the forms described in our co-pending application above identified. The output of the probe is supplied to a suitable computer 14 which yields an electrical output representing a function of the viscosity of the fluid-like material at the existing temperature. Also inserted in the pipe line 10 is a temperature-sensitive device 15, here shown as a resistance bulb thermometer, which is adapted to respond to the temperature of the fluid-like material. The output of computer 14 and the response of device 15 are supplied to a temperature compensating computer 16 which is designed to produce a correction signal which is combined with the original output of viscosity computer 14 so as to yield a resultant output at line 17 which represents the viscosity at a predetermined reference temperature. A knob 18 is provided for the adjustment of the reference temperature, and another knob 19 is provided to adjust the temperature compensation for fluid-like materials of different temperature-viscosity characteristics.

The resultant may then be fed to any type of indicator desired, here shown as a recorder, or recorder-controller 20.

It will be understood that the use of the apparatus illustrated in Fig. 1 is not confined to fluid-like materials flowing in a pipe. In the case of a batch operation where the liquid or other fluid-like material is in a large container such as a vat, the viscosity probe 13 and thermometer 15 can be placed in the liquid in any desired manner. Generally speaking, it is only necessary that some means be provided for obtaining an indication of the temperature of the material at the time its viscosity is being determined.

The principles on which the temperature compensating computer is based will now be explained.

It has been found that the variation of viscosity with temperature over a limited temperature range follows substantially a logarithmic law. That is, over a limited temperature range the logarithm of viscosity is a decreasing linear function of temperature. This can be expressed as:

$$\ln \eta = \ln \eta_0 - m(T-T_0) \tag{1}$$

Where $\eta$ = viscosity at temperature $T$
$\eta_0$ = viscosity at temperature $T_0$
$T$ = temperature at which the viscosity is measured
$T_0$ = the desired reference temperature
$m$ = a constant for a particular material over a limited temperature range, and is the slope of the characteristic curve of the logarithm of viscosity plotted against temperature at the temperature $T_0$ Equation 1 can also be written as follows:

$$\eta_0 = \eta e^{m(T-T_0)} \quad (2)$$

By expanding Equation 2 into a power series and neglecting all terms of second order and higher, the following equation is obtained:

$$\eta_0 = \eta[1 + m(T-T_0)] \quad (3)$$

Equation 3, while an approximation, is sufficiently accurate for practical purposes over the relatively narrow range of temperature variation encountered in many industrial processes. From Equation 3 it can be seen that if an electrical output proportional to $\eta$ is first obtained, and a second electrical output added thereto which is proportional to the product of the first output and the difference between the existing temperature and a predetermined reference temperature, the resultant will represent the viscosity of the material at the reference temperature. A number of electrical circuits can be devised for accomplishing this result, and Fig. 2 represents a simple arrangement which has been found highly satisfactory in practice.

Figure 2:
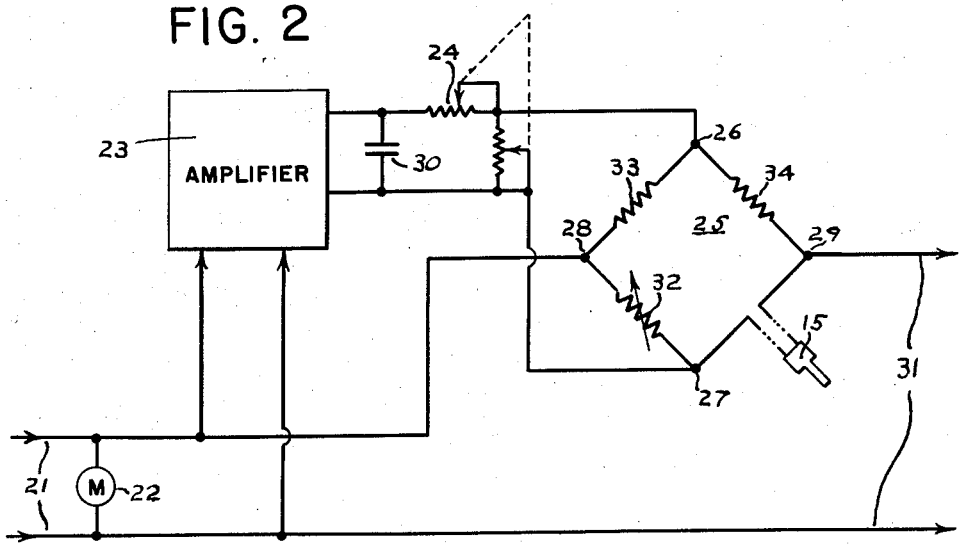
Fig. 2 shows a specific circuit arrangement for the temperature-compensating computer of Fig. 1.

Referring to Fig. 2, the input 21 is supplied with the output of the viscosity computer 14 of Fig. 1. This computer may be of the type described in our above-identified application or any other instrument designed or adapted to give an electrical output which varies as a function of viscosity of the material being measured. A meter 22 is shown connected across output 21 so as to give an indication of the viscosity at the existing temperature. This may be the meter shown in the drawings of the above-identified application and the electrical output may be taken thereacross. Of course, suitable modifications of the viscosity computer can be made to supply an output signal of desired amplitude to the input 21 of Fig. 2. Amplifier 23 is supplied with the input signal and as here employed is of the type designed to provide a current output which is proportional to the signal input. While many different types of amplifiers may be employed, it has been found very convenient and satisfactory to employ a magnetic amplifier of the type shown in Fig. 3. The output of amplifier 23 is supplied through an attenuator 24 to one diagonal 26—27 of bridge 25. The other diagonal 28—29 is placed in series with the input at 21 so that the output at lines 31 is the algebraic sum of the input voltage and that existing across the diagonal 28—29 of the bridge. Capacitor 30 may be provided for filtering, if necessary.

As shown in Fig. 2, the entire input signal at 21 is applied to amplifier 23 and to terminal 28 of the bridge. However, if desired a divider or other arrangement may be employed to supply the output signal from viscosity computer 14 at different levels to the amplifier 23 and to terminal 28 of the bridge.

As shown, the resistance bulb thermometer 15 is inserted in one leg of the bridge and an adjustable resistance 32 is placed in a second leg. Resistors 33 and 34 are placed in the remaining legs and may advantageously be of equal value.

Figure 4:
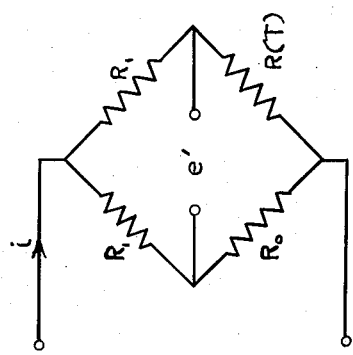
Fig. 4 is an explanatory diagram.

The manner in which the bridge circuit functions may be understood most clearly by reference to Fig. 4 and the following equations. In Fig. 4 a current $i$ is assumed to be applied to a bridge composed of two equal resistors $R_1$, a resistor $R(T)$ which varies as a function of temperature, and a fourth resistor $R_0$. By suitable application of well known electrical laws it can be shown that $$e' = \left( \frac{R_0 - R(T)}{2 + \frac{R_0}{R_1} + \frac{R(T)}{R_1}} \right) i \quad (4)$$

A resistance thermometer has a substantially linear variation in resistance with temperature over a range such as encountered in practical applications of the present invention. Hence, the resistance $R(T)$ may be written:

$$R(T) = R_0[1 + p(T-T_0)] \quad (5)$$

The resistance $R_0$ in Equation 5 is of the same value as that shown in one leg of Fig. 4 and indicates that the bridge is balanced when T equals $T_0$. By inserting Equation 5 in 4, the following equation is obtained:

$$e' = \frac{-R_0 p(T-T_0)}{2 + 2\frac{R_0}{R_1} + \frac{R_0}{R_1} p(T-T_0)} i \quad (6)$$

In a practical case the coefficient of the variation in resistance with temperature of a resistance thermometer is very small, so that it is a simple matter to make $$\frac{R_0}{R_1} p(T-T_0)$$

very small as compared to $$2 + 2\frac{R_0}{R_1}$$

Thus, Equation 6 can be simplified to the following equation:

$$e' = \frac{-R_0 p(T-T_0)}{2 + 2\frac{R_0}{R_1}} i \quad (7)$$

In the viscosity computer described in our above-identified application an output voltage is produced which is proportional to the square root of the viscosity. This can be written:

$$e = k\sqrt{\eta} \quad (8)$$

where $k$ is a constant.

The output voltage $e$ also is proportional to the square root of the density of the material, but in most practical cases the density change with temperature is negligible over the range considered for temperature compensation purposes and can be neglected.

Referring back to Fig. 2, the amplifier 23 is supplied with the voltage $e$ and produces a current proportional thereto. This may be expressed as:

$$i = k'e \quad (9)$$

Inserting Equation 9 in Equation 7 we obtain:

$$e' = \frac{-k' R_0 p(T-T_0)}{2 + 2\frac{R_0}{R_1}} e \quad (10)$$

The voltage $e'$ is that existing across diagonal 28—29 and is added to the voltage $e$ at input 21. Accordingly, the output voltage $e_0$ at terminals 31 may be expressed by the following equation:

$$e_0 = e + e' = e\left[1 - \frac{k' R_0 p(T-T_0)}{2 + 2\frac{R_0}{R_1}}\right] \quad (11)$$

The second expression within the brackets of Equation 11 is small compared to 1. Hence Equation 8 may be inserted in Equation 11 and the square written as:

$$e_0^2 = k^2 \eta \left[1 - \frac{k' R_0 p(T-T_0)}{1 + \frac{R_0}{R_1}}\right] \quad (12)$$

As a design constant we may set $$\frac{-k' R_0 p}{1 + \frac{R_0}{R_1}} = m \quad (13)$$

Then Equation 12 becomes:

$$e_0^2 = k^2 \eta[1 + m(T-T_0)]$$

By comparing Equation 14 with Equation 3 it will be seen that the square of the output voltage $e_0$ is proportional to the viscosity at the reference temperature $T_0$, just as the square of the output voltage $e$ (Equation 8) is proportional to the viscosity at the actual temperature. Hence, it is clear that the arrangement of Fig. 2 provides the temperature compensation that is required to the degree of approximation selected.

By altering the value of resistor 32, the bridge can be balanced at any desired temperature of the resistance thermometer 15, and hence the reference temperature, $T_0$ predetermined at will. By varying attenuator 24 the constant $K'$ in Equation 9 is changed and hence the value of $m$ in Equation 13. Thus, the compensation may be adapted to liquids or other fluid-like materials having different viscosity-temperature characteristics.

In use, the initial balance of the bridge may be obtained by bringing the liquid or other fluid-like material to the desired reference temperature and adjusting resistor 32 until the output voltage at terminals 31 is the same as the input voltage at terminals 21. Under these conditions no voltage is contributed by the bridge circuit. Then, the temperature of the liquid or other fluid-like material may be, say increased. This causes the input $e$ at terminals 21 to decrease since the viscosity is lower. The output $e'$ across the diagonal 28—29 of the bridge circuit is phased so that the voltage of the bridge circuit adds to the input voltage so as to increase the resultant output voltage. The actual magnitude of the voltage $e'$ is determined by adjusting attenuator 24 so that the resultant output $e_0$ at terminals 31 is equal to the value obtained at the reference temperature. After this initial adjustment the apparatus automatically compensates for subsequent temperature changes.

Figure 3:
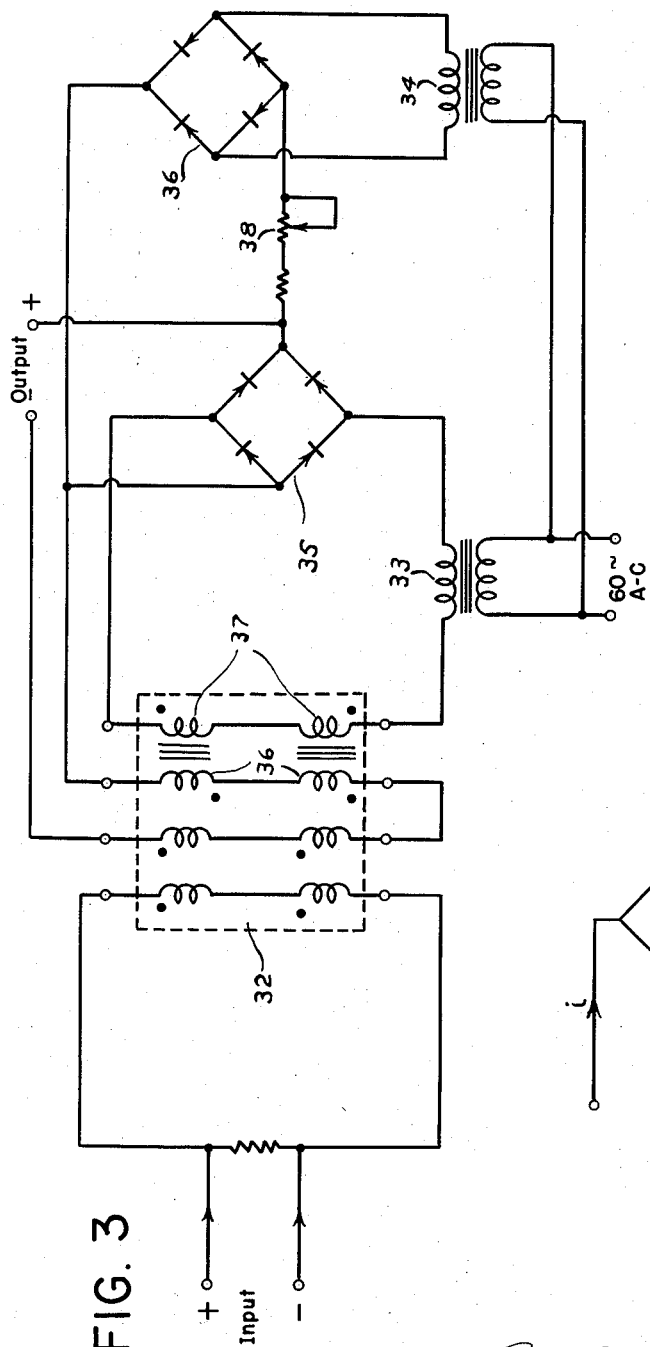
Fig. 3 is a circuit diagram of a magnetic amplifier which can be employed in the arrangement of Fig. 2.

Fig. 3 shows one example of a magnetic amplifier suitable for use in the arrangement shown in Fig. 2. This may follow conventional design and need not be described in detail. As indicated, the input is applied to a reactor 32. Alternating current from the A. C. mains is supplied through transformers 33 and 34 to balanced bridge rectifiers 35 and 36. The rectified current flows through coils 36 of the reactor. A resistor 38 is provided in order to balance the amplifier to give zero output current for zero input. The details of magnetic amplifiers are well known in the art and further description is believed unnecessary.

It will be understood that although a magnetic amplifier is strictly speaking a current amplifier, its input impedance is substantially constant and may be made sufficiently high so that a voltage source may be employed therewith. To maintain constant amplification, it is advisable to maintain constant the output impedance, hence the attenuator 24 is advantageously of the constant impedance type such as the L— pad shown.

In one specific embodiment which has been operated with success the amplifier was designed to work into a 600 ohm load and a 600 ohm attenuator employed. Resistors 33 and 34 were 400 ohms each, thermometer 15 has a nominal resistance of about 600 ohms, and resistor 32 was variable from 500 to 700 ohms. The output at 31 was fed into a recorder of high input impedance.

A regulated A. C. power supply was employed for the magnetic amplifier to insure that its gain would remain constant despite line voltage variations.

The over-all operation of this embodiment was found to be very satisfactory. For example, variation of only 1% in compensated viscosity was experienced over a temperature range of ±15° F. around a process temperature of 140° F. At higher temperatures a similar precision in automatic temperature compensation has been obtained over a temperature range of ±50° F. around a center reference temperature of 500° F.

In order to obtain greater sensitivity in the temperature compensating computer of Fig. 2, two thermometers may be employed instead of one. In this case the second thermometer may be inserted in place of resistor 33, and resistor 34 made variable and equal to resistor 32, and mechanically coupled to the latter for simultaneous adjustment during calibration. For this modification Equation 4 will become $$e' = \left(\frac{R_0 - R(T)}{2}\right)i \qquad (15)$$

Subsequent equations will be changed in detail, as will be understood, but the overall functioning of the instrument will be the same as that described.

The invention has been described in connection with one specific embodiment thereof, and certain modifications mentioned. It will be understood that other variations and modifications may be made within the spirit and scope of the invention as described in the claims. Also, more elaborate correction may be provided by including higher order terms and appropriate circuitry therefor.

We claim:

1. In a viscosimeter having an electrical output which varies as a function of viscosity of a fluid-like material, apparatus for temperature compensating said output which comprises a temperature-sensitive device adapted to respond to the temperature of said fluid-like material, circuit means supplied with said electrical output and having said temperature-sensitive device included therein for producing a second electrical output which varies with the first-mentioned electrical output and the difference between said temperature and a predetermined reference temperature, and means for combining said first and second electrical outputs to obtain a resultant output representing the viscosity of said fluid-like material at said predetermined temperature.

2. In a viscosimeter having an electrical output which varies as a function of viscosity of a fluid-like material, apparatus for temperature compensating said output which comprises a temperature-sensitive device adapted to respond to the temperature of said fluid-like material, an electrical circuit having said temperature-sensitive device included therein and having input and output circuits, said electrical circuit being adapted to produce an electrical output substantially proportional to the product of an input signal supplied thereto and the difference between the response of said temperature-sensitive device at said temperature and at a predetermined reference temperature, connections supplying the first-mentioned electrical output to the input of said electrical circuit, and means for combining said first and second mentioned electrical outputs to obtain a resultant electrical output representing the viscosity of said fluid-like material at said predetermined temperature.

3. In a viscosimeter having an electrical output which varies as a function of viscosity of a fluid-like material, apparatus for temperature compensating said output which comprises a temperature-sensitive device adapted to respond to the temperature of said fluid-like material, an electrical circuit having said temperature-sensitive device included therein and having input and output circuits, said electrical circuit being adapted to produce an electrical output substantially proportional to the product of an input signal supplied thereto and the difference between the response of said temperature-sensitive device at said temperature and at a predetermined reference temperature, connections supplying the first-mentioned electrical output to the input of said electrical circuit, means for combining said first and second-mentioned electrical outputs to obtain a resultant electrical output representing the viscosity of said fluid-like material at said predetermined temperature, and means for altering the proportion of said first-mentioned electrical output applied to said electrical circuit whereby the compensation may be altered for fluid-like materials of different viscosity-temperature characteristics.

4. In a viscosimeter having an electrical output which varies as a function of viscosity of a fluid-like material, apparatus for temperature compensating said output which comprises an electrical bridge circuit having in at least one leg thereof a thermally-responsive impedance device adapted to respond to the temperature of said fluid-like material, said bridge circuit having an input and an output circuit and being adapted to yield an output varying with the product of an input supplied thereto and the difference between the response of said thermometer at said temperature and at a predetermined reference temperature, circuit connections supplying the first-mentioned electrical output to the input of said bridge circuit, and circuit connections combining the first-mentioned electrical output with the output of said bridge circuit to yield a resultant electrical output representing the viscosity of said fluid-like material at said reference temperature.

5. In a viscosimeter having an electrical output which varies as a function of viscosity of a fluid-like material, apparatus for temperature compensating said output which comprises an electrical bridge circuit having in at least one leg thereof a thermally-responsive device whose impedance is adapted to vary with the temperature of said fluid-like material, circuit connections supplying said electrical output to one diagonal of said bridge, and circuit connections combining the output of the other diagonal of said bridge with the first-mentioned electrical output to yield a resultant output representing the viscosity of said fluid-like material at a predetermined reference temperature.

6. In a viscosimeter having an electrical output which varies as a function of viscosity of a fluid-like material, apparatus for temperature compensating said output which comprises a resistance bridge circuit having in at least one leg thereof a resistance thermometer adapted to respond to the temperature of said fluid-like material, circuit connections supplying said electrical output to one diagonal of said bridge, and circuit connections placing the other diagonal of said bridge circuit in series with the first-mentioned electrical output to yield a resultant electrical output representing the viscosity of said fluid-like material at a predetermined reference temperature.

7. In a viscosimeter having an electrical output which varies as a function of viscosity of a fluid-like material, apparatus for temperature compensating said output which comprises a resistance bridge circuit having in at least one leg thereof a resistance thermometer adapted to respond to the temperature of said fluid-like material, circuit connections supplying said electrical output to one diagonal of said bridge, circuit connections placing the other diagonal of said bridge circuit in series with the first-mentioned electrical output to yield a resultant electrical output representing the viscosity of said fluid-like material at a pre-determined reference temperature, means for adjusting the resistance of at least one other leg of said bridge to thereby alter said reference temperature, and means for altering the magnitude of said first-mentioned electrical output as applied to said bridge whereby the compensation may be altered for fluid-like materials of different viscosity-temperature characteristics.

8. In a viscosimeter having an output circuit yielding an output signal which varies as a function of viscosity of a fluid-like material, apparatus for temperature compensating said output which comprises an amplifier supplied with said output signal and adapted to produce a current proportional thereto, a resistance bridge circuit having in at least one leg thereof a resistance thermometer adapted to respond to the temperature of said fluid-like material, connections supplying the output of said amplifier to one diagonal of said bridge, and connections placing the other diagonal of said bridge in series with the first-mentioned output circuit to yield a resultant output signal representing the viscosity of said liquid at a predetermined reference temperature.

9. In a viscosimeter having an output circuit yielding an output voltage which varies as a function of viscosity of a fluid-like material, apparatus for automatically temperature compensating said output which comprises an amplifier supplied with said output voltage and adapted to produce a current proportional thereto, a resistance bridge circuit having in at least one leg thereof a resistance thermometer adapted to respond to the temperature of said fluid-like material, connections supplying the output of said amplifier to one diagonal of said bridge, connections placing the other diagonal of said bridge in series with said output circuit to yield a resultant output voltage representing the viscosity of said liquid at a predetermined reference temperature, means for adjusting the resistance of at least one other leg of said bridge to thereby alter said reference temperature, and means for altering the amplification of the output of said amplifier as applied to said bridge whereby the automatic compensation may be altered for fluid-like materials of different viscosity-temperature characteristics.

10. In a viscosimeter having an output circuit yielding an output voltage which varies as a function of viscosity of a fluid-like material, apparatus for automatically temperature compensating said output which comprises a magnetic amplifier supplied with said output voltage and adapted to produce a current proportional thereto, a resistance bridge circuit having in a first leg thereof a resistance thermometer adapted to respond to the temperature of said fluid-like material, connections supplying the output of said amplifier to one diagonal of said bridge, connections placing the other diagonal of said bridge in series with said output circuit to yield a resultant output voltage representing the viscosity of said liquid at a predetermined reference temperature, the resistances in a second and a third leg of said bridge being substantially equal and constant and the resistance in the fourth leg being adjustable to thereby adjust the bridge balance for a different reference temperature, and an adjustable attenuator between said amplifier and bridge circuit whereby the automatic compensation may be altered for fluid-like materials of different viscosity-temperature characteristics.

11. In a viscosimeter having an electrical output which varies in magnitude substantially as the square-root of the viscosity of a fluid-like material, apparatus for temperature compensating said output which comprises a temperature-sensitive device responsive to the temperature of said fluid-like material and having an electrical characteristic which varies substantially linearly with temperature over a substantial range for which compensation is effected, an electrical circuit having said temperature-sensitive device included therein and having input and output circuits, said electrical circuit being adapted to produce an electrical output substantially proportional to the product of an input signal supplied thereto and the difference between the response of said temperature-sensitive device at said temperature and at a predetermined reference temperature, connections supplying the first-mentioned electrical output to the input of said electrical circuit, and means for algebraically adding said first and second mentioned electrical outputs to obtain a resultant electrical output whose magnitude varies substantially as the square-root of the viscosity of said fluid-like material at said predetermined temperature.

References Cited in the file of this patent

UNITED STATES PATENTS

| | | |
|---|---|---|
| 1,228,678 | Johnson | June 5, 1917 |
| 2,396,420 | Hayward et al. | Mar. 12, 1946 |
| 2,530,022 | Mershon | Nov. 14, 1950 |
| 2,708,361 | Boyle et al. | May 17, 1955 |